US011003865B1

(12) United States Patent
Lee et al.

(10) Patent No.: US 11,003,865 B1
(45) Date of Patent: May 11, 2021

(54) RETRIEVAL-AUGMENTED LANGUAGE MODEL PRE-TRAINING AND FINE-TUNING

(71) Applicant: Google LLC, Mountain View, CA (US)

(72) Inventors: Kenton Chiu Tsun Lee, Mountain View, CA (US); Kelvin Gu, Mountain View, CA (US); Zora Tung, Mountain View, CA (US); Panupong Pasupat, Mountain View, CA (US); Ming-Wei Chang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/879,457

(22) Filed: May 20, 2020

(51) Int. Cl.
*G06F 40/49* (2020.01)
*G06F 40/56* (2020.01)
*G06N 5/02* (2006.01)
*G06K 9/62* (2006.01)

(52) U.S. Cl.
CPC .............. *G06F 40/49* (2020.01); *G06F 40/56* (2020.01); *G06K 9/6259* (2013.01); *G06N 5/022* (2013.01); *G06N 5/025* (2013.01)

(58) Field of Classification Search
None
See application file for complete search history.

(56) References Cited

U.S. PATENT DOCUMENTS

| 6,006,221 | A  | * | 12/1999 | Liddy    | ........... | G06F 16/3337 |
| 2010/0332511 | A1 | * | 12/2010 | Stockton | ............ | G06F 16/313 |
| | | | | | | 707/759 |

OTHER PUBLICATIONS

Asai, A., Hashimoto, K., Hajishirzi, H., Socher, R., and Xiong, C. Learning to retrieve reasoning paths over wikipedia graph for question answering. arXiv preprint arXiv:1911.10470, 2019, pp. 1-22.

Bahdanau, D., Cho, K., and Bengio, Y. Neural machine translation by jointly learning to align and translate. arXiv preprint arXiv:1409.0473, 2014, pp. 1-15.

Berant, J., Chou, A., Frostig, R., and Liang, P. Semantic parsing on freebase from question-answer pairs. In Proceedings of the 2013 Conference on Empirical Methods in Natural Language Processing, pp. 1533-1544, 2013.

(Continued)

*Primary Examiner* — Quynh H Nguyen
(74) *Attorney, Agent, or Firm* — Botos Churchill IP Law LLP

(57) ABSTRACT

Systems and methods for pre-training and fine-tuning of neural-network-based language models are disclosed in which a neural-network-based textual knowledge retriever is trained along with the language model. In some examples, the knowledge retriever obtains documents from an unlabeled pre-training corpus, generates its own training tasks, and learns to retrieve documents relevant to those tasks. In some examples, the knowledge retriever is further refined using supervised open-QA questions. The framework of the present technology provides models that can intelligently retrieve helpful information from a large unlabeled corpus, rather than requiring all potentially relevant information to be stored implicitly in the parameters of the neural network. This framework may thus reduce the storage space and complexity of the neural network, and also enable the model to more effectively handle new tasks that may be different than those on which it was pre-trained.

20 Claims, 14 Drawing Sheets

(56) References Cited

OTHER PUBLICATIONS

Brill, E., Dumais, S., and Banko, M. An analysis of the askmsr question-answering system. In Empirical Methods in Natural Language Processing, 2002, pp. 257-264.
Chen, D., Fisch, A., Weston, J., and Bordes, A. Reading wikipedia to answer open-domain questions. In Proceedings of the 55th Annual Meeting of the Association for Computational Linguistics (vol. 1: Long Papers), vol. 1, pp. 1870-1879, 2017.
Clark, C. and Gardner, M. Simple and effective multiparagraph reading comprehension. In Annual Meeting of the Association for Computational Linguistics, 2017, pp. 1-11.
Dai, A. M. and Le, Q. V. Semi-supervised sequence learning. In Advances in neural information processing systems, pp. 1-9, 2015.
Devlin, J., Chang, M.-W., Lee, K., and Toutanova, K. Bert: Pre-training of deep bidirectional transformers for language understanding. arXiv preprint arXiv:1810.04805, 2018, pp. 1-14.
Graves, A., Wayne, G., and Danihelka, I. Neural turing machines. ArXiv, abs/1410.5401, 2014, pp. 1-26.
Guu, K., Hashimoto, T. B., Oren, Y., and Liang, P. Generating sentences by editing prototypes. Transactions of the Association for Computational Linguistics, 6:437-450, 2018.
Guu, K., REALM: Retrieval-Augmented Language Model Pre-Training, arXiv: 2002.08909v1, pp. 1-12, Feb. 2020.
Hashimoto, T. B., Guu, K., Oren, Y., and Liang, P. S. A retrieve-and-edit framework for predicting structured outputs. In Advances in Neural Information Processing Systems, pp. 10052-10062, 2018.
Joshi, M., Chen, D., Liu, Y., Weld, D. S., Zettlemoyer, L., and Levy, O. SpanBERT: Improving pre-training by representing and predicting spans. arXiv preprint arXiv:1907.10529, 2019, pp. 1-12.
Khandelwal, U., Levy, O., Jurafsky, D., Zettlemoyer, L., and Lewis, M. Generalization through memorization: Nearest neighbor language models. ArXiv, abs/1911.00172, 2019, pp. 1-13.
Kiros, R., Zhu, Y., Salakhutdinov, R. R., Zemel, R., Urtasun, R., Torralba, A., and Fidler, S. Skip-thought vectors. In Advances in neural information processing systems, pp. 3294-3302, 2015.
Kwiatkowski, T., et al. Natural questions: a benchmark for question answering research. Transactions of the Association for Computational Linguistics, 2019, pp. 1-14.
Lample, G., Sablayrolles, A., Ranzato, M., Denoyer, L., and J'egou, H. Large memory layers with product keys. In Advances in Neural Information Processing Systems, pp. 8546-8557, 2019.
Lee, K., Chang, M.-W., and Toutanova, K. Latent retrieval for weakly supervised open domain question answering. In Proceedings of the Conference of Association for Computational Linguistics, 2019, pp. 1-11.
Lee, K., Salant, S., Kwiatkowski, T., Parikh, A., Das, D., and Berant, J. Learning recurrent span representations for extractive question answering. arXiv preprint arXiv:1611.01436, 2016, pp. 1-9.
Lewis, M., Liu, Y., Goyal, N., Ghazvininejad, M., Mohamed, A., Levy, O., Stoyanov, V., and Zettlemoyer, L. Bart: Denoising sequence-to-sequence pre-training for natural language generation, translation, and comprehension. ArXiv, abs/1910.13461, 2019, pp. 1-10.
Liu, Y., Ott, M., Goyal, N., Du, J., Joshi, M., Chen, D., Levy, O., Lewis, M., Zettlemoyer, L., and Stoyanov, V. Roberta: A robustly optimized bert pretraining approach. arXiv preprint arXiv:1907.11692, 2019, pp. 1-13.
Mikolov, T., Chen, K., Corrado, G., and Dean, J. Efficient estimation of word representations in vector space. arXiv preprint arXiv:1301.3781, 2013.
Mikolov, T., Sutskever, I., Chen, K., Corrado, G. S., and Dean, J. Distributed representations of words and phrases and their compositionality. In Advances in neural information processing systems, pp. 3111-3119, 2013.
Miller, A., Fisch, A., Dodge, J., Karimi, A.-H., Bordes, A., and Weston, J. Key-value memory networks for directly reading documents. arXiv preprint arXiv:1606.03126, 2016, pp. 1-10.
Min, S., Chen, D., Hajishirzi, H., and Zettlemoyer, L. A discrete hard em approach for weakly supervised question answering. arXiv preprint arXiv:1909.04849, 2019, pp. 1-11.
Min, S., Chen, D., Zettlemoyer, L., and Hajishirzi, H. Knowledge guided text retrieval and reading for open domain question answering. arXiv preprint arXiv:1911.03868, 2019, pp. 1-11.
Peters, M. E., Neumann, M., IV, R. L. L., Schwartz, R., Joshi, V., Singh, S., and Smith, N. A. Knowledge enhanced contextual word representations, 2019, pp. 43-54.
Peters, M. E., Neumann,M., Iyyer,M., Gardner,M., Clark, C., Lee, K., and Zettlemoyer, L. Deep contextualized word representations. In Proc. of NAACL, 2018, pp. 2227-2237.
Petroni, F., Rocktaschel, T., Lewis, P., Bakhtin, A., Wu, Y., Miller, A. H., and Riedel, S. Language models as knowledge bases? arXiv preprint arXiv:1909.01066, 2019, pp. 1-11.
Radford, A., Narasimhan, K., Salimans, T., and Sutskever, I. Improving language understanding with unsupervised learning. Technical report, OpenAI, 2018, pp. 1-12.
Radford, A., Wu, J., Child, R., Luan, D., Amodei, D., and Sutskever, I. Language models are unsupervised multitask learners. OpenAI Blog, 2019, pp. 1-24.
Raffel, C., Shazeer, N., Roberts, A., Lee, K., Narang, S., Matena, M., Zhou, Y., Li, W., and Liu, P. J. Exploring the limits of transfer learning with a unified text-to-text transformer. arXiv preprint arXiv:1910.10683, 2019.
Rajpurkar, P., Jia, R., and Liang, P. Know what you don't know: Unanswerable questions for squad. arXiv preprint arXiv:1806.03822, 2018.
Rajpurkar, P., Zhang, J., Lopyrev, K., and Liang, P. Squad: 100,000+ questions for machine comprehension of text. In Proceedings of the 2016 Conference on Empirical Methods in Natural Language Processing, pp. 2383-2392, 2016.
Ram, P. and Gray, A. G. Maximuminner-product search using cone trees. In Proceedings of the 18th ACMSIGKDD international conference on Knowledge discovery and data mining, pp. 931-939, 2012.
Roberts, A., Raffel, C., and Shazeer, N. How much knowledge can you pack into the parameters of a language model? arXiv preprint arXiv:TBD, 2020, pp. 1-6.
Robertson, S., Zaragoza, H., et al. The probabilistic relevance framework: Bm25 and beyond. Foundations and Trends in Information Retrieval, 3(4):333-389, 2009.
Sang, E. T. K. and De Meulder, F. Introduction to the conll-2003 shared task: Language-independent named entity recognition. In Proceedings of the Seventh Conference on Natural Language Learning at HLT-NAACL 2003, pp. 1-6, 2003.
Seo, M., Kembhavi, A., Farhadi, A., and Hajishirzi, H. Bidirectional attention flow for machine comprehension. In International Conference on Learning Representations, 2017, pp. 1-13.
Shen, F., Liu, W., Zhang, S., Yang, Y., and Tao Shen, H. Learning binary codes for maximum inner product search. In Proceedings of the IEEE International Conference on Computer Vision, pp. 4148-4156, 2015.
Shrivastava, A. and Li, P. Asymmetric lsh (alsh) for sublinear time maximum inner product search (mips). In Advances in Neural Information Processing Systems, pp. 1-9, 2014.
Sukhbaatar, S., Weston, J., Fergus, R., et al. End-to-end memory networks. In Advances in neural information processing systems, 2015, pp. 1-11.
Weston, J., Chopra, S., and Bordes, A. Memory networks. arXiv preprint arXiv:1410.3916, 2014, pp. 1-9.
Clark, Christoper, et al., BoolQ: Exploring the Surprising Difficulty of Natural Yes/No Questions, Proceedings of NAACL-HLT 2019, pp. 2924-2936.
Ding, Qin, et al., A Fast Sampling Algorithm for Maximum Inner Product Search, 2019, pp. 1-9.
Horev, Rani, BERT Explained: State of the art language model for NLP, 2018, pp. 1-7.
Laxman, Vijay, Probability and Statistics explained in the context of deep learning, a practical approach to get you up quickly, 2018, pp. 1-21.
Manwani, Naveen, Generative Deep Learning: Let's seek how AI Extending, not Replacing Creative Process, 2018, pp. 1-11.
Mussman, et al., Learning and Inference via Maximum Inner Product Search, 33rd International Conference on Machine Learning, JMLR: W&CP vol. 48, 2016, pp. 1-13.

(56) References Cited

OTHER PUBLICATIONS

Schwab, Adam , Embeddings: A Matrix of Meaning, Petuum, Inc., Jul. 10, 2018, pp. 1-8.

* cited by examiner

202

Knowledge retriever retrieves a document (or portion thereof) from an unlabeled pre-training corpus X (e.g., Wikipedia)

204

Knowledge retriever selects a passage of text from the document (e.g., the passage may be the sentence "The pound is the currency of the United Kingdom.")

206

Knowledge retriever creates a masked language modeling task x by replacing one or more words of the selected passage with a masking token (e.g., x may be "The [MASK] is the currency of the United Kingdom.")

Knowledge retriever receives or generates a masked language modeling task $x$ (e.g., $x$ may be a task such as "The [MASK] is the currency of the United Kingdom")

304

Knowledge retriever applies tokenization to the text of task $x$, using prefix and separator tokens, yielding a tokenized version of $x$
(e.g., "[CLS] The [SEP] [MASK] [SEP] is [SEP] the [SEP] currency [SEP] of [SEP] the [SEP] United [SEP] Kingdom [SEP].")

306

Knowledge retriever transforms the tokenized version of $x$ using a Deep Bidirectional BERT-style transformer, yielding a transformed version of $x$ that includes a vector for each token

308

Knowledge retriever performs a linear projection on the transformed version of $x$, multiplying it by a projection matrix to reduce its dimensionality, yielding a $d$-dimensional vector, $\text{Embed}_{input}(x)$

Using $\text{Embed}_{input}(x)$ and a search index of all $\text{Embed}_{doc}(z)$ vectors, the knowledge retriever employs a Maximum Inner Product Search (MIPS) algorithm to identify the top $k$ documents according to their relevance scores $f(x,z) = \text{Embed}_{input}(x)^T \text{Embed}_{doc}(z)$

504

Knowledge retriever normalizes the relevance scores $f(x,z)$ of the top k documents using a softmax function, yielding a distribution $p(z \mid x)$

506

Knowledge retriever retrieves the top $k$ documents from knowledge corpus $Z$

902 — Language model receives top k documents relevant to question x from knowledge retriever 904 — For each span of text y in document z, the language model identifies the set of spans S(z, y) that match span y in document z and inserts a start token and end token at the beginning and end of every instance s of that span 906 — For each individual document z in the top k documents, language model joins x and the tokenized body text of document z together using a prefix token before x and a separator token between x and z, yielding a single tokenized sequence join(x, z)

908 — Language model feeds join(x, z) into a Deep Bidirectional BERT-style transformer, yielding a vector $h_{START(s)}$ for the start tokens for each instance s of span y in z 910 — Language model feeds join(x, z) into a Deep Bidirectional BERT-style transformer, yielding a vector $h_{END(s)}$ for the end tokens for each instance s of span y in z 912 — For each instance s of span y in z, language model connects the corresponding $h_{START(s)}$ and $h_{END(s)}$ vectors to a feed-forward MLP neural network, sums the exponentials of the MLP output, and normalizes it by dividing by the sum of the exponentials of the MLP outputs for every instance of span s' in the set of all spans S(z) in document z, yielding a distribution $p(y \mid z, x)$ 914 — Language model calculates the sum of the product $p(y \mid z, x)\, p(z \mid x)$ for every document z in the top k documents, yielding a distribution $p(y \mid x)$

RETRIEVAL-AUGMENTED LANGUAGE MODEL PRE-TRAINING AND FINE-TUNING

BACKGROUND

Natural language processing ("NLP") tasks such as question answering rely upon a language model having been pre-trained on world knowledge. Recent advances in language-model pre-training have demonstrated that language models such as Bidirectional Encoder Representations from Transformers ("BERT") and Text-to-Text Transfer Transformer ("T5") can capture a surprising amount of world knowledge, acquired from a massive text corpora on which they are trained. However, as a language model accrues more and more knowledge, storing that knowledge implicitly in the parameters of a neural network can cause the network to significantly increase in size. This could adversely impact system operation.

BRIEF SUMMARY

The present technology relates to systems and methods for pre-training and fine-tuning of neural-network-based language models. More particularly, the technology relates to augmenting language model pre-training and fine-tuning by employing a neural-network-based textual knowledge retriever that is trained along with the language model. During pre-training, the knowledge retriever obtains documents (or portions thereof) from an unlabeled pre-training corpus (e.g., one or more online encyclopedias). The knowledge retriever automatically generates a training example by sampling a passage of text from one of the retrieved documents and randomly masking one or more tokens in the sampled piece of text (e.g., "The [MASK] is the currency of the United Kingdom.").

The knowledge retriever also retrieves additional documents from a knowledge corpus to be used by the language model in predicting the word that should go in each masked token. The language model then models the probabilities of each retrieved document in predicting the masked tokens, and uses those probabilities to continually rank and re-rank the documents (or some subset thereof) in terms of their relevance.

The knowledge retriever and language model are next fine-tuned using a set of different tasks. For example, the knowledge retriever may be fine-tuned using open-domain question and answering ("open-QA") tasks, in which the language model must try to predict answers to a set of direct questions (e.g., What is the capital of California?). During this fine-tuning stage, the knowledge retriever uses its learned relevance rankings to retrieve helpful documents for the language model to use in answering each question. The framework of the present technology provides models that can intelligently retrieve helpful information from a large unlabeled corpus, rather than requiring all potentially relevant information to be stored implicitly in the parameters of the neural network. This framework may thus reduce the storage space and complexity of the neural network, and also enable the model to more effectively handle new tasks that may be different than those on which it was pre-trained.

In one aspect, the disclosure describes a computer-implemented method of training a language model, comprising: generating, using one or more processors of a processing system, a masked language modeling task using text from a first document; generating, using the one or more processors, an input vector by applying a first learned embedding function to the masked language modeling task; generating, using the one or more processors, a document vector for each document of a knowledge corpus by applying a second learned embedding function to each document of the knowledge corpus, the knowledge corpus comprising a first plurality of documents; generating, using the one or more processors, a relevance score for each given document of the knowledge corpus based on the input vector and the document vector for the given document; generating, using the one or more processors, a first distribution based on the relevance score of each document in a second plurality of documents, the second plurality of documents being from the knowledge corpus; generating, using the one or more processors, a second distribution based on the masked language modeling task and text of each document in the second plurality of documents; generating, using the one or more processors, a third distribution based on the first distribution and the second distribution; and modifying, using the one or more processors, one or more parameters of at least the first learned embedding function or the second learned embedding function to generate an updated first distribution and an updated third distribution. In some aspects, the second plurality of documents is a subset of the first plurality of documents. In some aspects, the method further comprises: generating, using the one or more processors, a search index based on each document vector for each document of the knowledge corpus; and identifying, using the one or more processors, the second plurality of documents based on a maximum inner product search based on the search index and the input vector. In some aspects, the first learned embedding function comprises a Deep Bidirectional BERT-style transformer. In some aspects, the second learned embedding function comprises a Deep Bidirectional BERT-style transformer. In some aspects, generating the second distribution further comprises processing, by the one or more processors, the masked language modeling task and text of each document in the second plurality of documents using a Deep Bidirectional BERT-style transformer. In some aspects, the knowledge corpus comprises one or more websites remote from the processing system.

In some aspects, the method further comprises: generating, using the one or more processors, an updated input vector by applying the first learned embedding function to the masked language modeling task, the first learned embedding function including one or more parameters modified as a result of the modifying; generating, using the one or more processors, an updated document vector for each document of the knowledge corpus by applying the second learned embedding function to each document of the knowledge corpus, the second learned embedding function including one or more parameters modified as a result of the modifying; generating, using the one or more processors, an updated relevance score for each given document of the knowledge corpus based on the updated input vector, and the updated document vector for the given document; and retrieving, using the one or more processors, a third plurality of documents from the knowledge corpus based on the updated relevance score of each document in the third plurality of documents. Moreover, in such aspects, the method may further comprise generating, using the one or more processors, an updated search index based on each updated document vector for each document of the knowledge corpus, and the step of retrieving the third plurality of documents from the knowledge corpus based on the updated relevance score of each document in the third plurality of documents may further comprise employing a maximum inner product search based on the updated search index and the updated input vector.

In some aspects, the method further comprises: receiving, using the one or more processors, a query task, the query task comprising an open-domain question and answering task; generating, using the one or more processors, a query input vector by applying the first learned embedding function to the query task, the first learned embedding function including one or more parameters modified as a result of the modifying; generating, using the one or more processors, a query relevance score for each given document of the knowledge corpus based on the query input vector, and the document vector for the given document; and retrieving, using the one or more processors, a third plurality of documents from the knowledge corpus based on the query relevance score of each document in the third plurality of documents.

In another aspect, the disclosure describes a processing system for performing natural language processing, comprising: a memory; and one or more processors coupled to the memory. In that regard, the one or more processors are configured to: generate a masked language modeling task using text from a first document; generate an input vector by applying a first learned embedding function to the masked language modeling task; generate a document vector for each document of a knowledge corpus by applying a second learned embedding function to each document of the knowledge corpus, the knowledge corpus comprising a first plurality of documents; generate a relevance score for each given document of the knowledge corpus based on the input vector and the document vector for the given document; generate a first distribution based on the relevance score of each document in a second plurality of documents, the second plurality of documents being from the knowledge corpus; generate a second distribution based on the masked language modeling task and text of each document in the second plurality of documents; generate a third distribution based on the first distribution and the second distribution; and modify one or more parameters of at least the first learned embedding function or the second learned embedding function to generate an updated first distribution and an updated third distribution. In some aspects, the second plurality of documents is a subset of the first plurality of documents. In some aspects, the system's one or more processors are further configured to: generate a search index based on each document vector for each document of the knowledge corpus; and identify the second plurality of documents based on a maximum inner product search based on the search index and the input vector. In some aspects, the first learned embedding function comprises a Deep Bidirectional BERT-style transformer. In some aspects, the second learned embedding function comprises a Deep Bidirectional BERT-style transformer. In some aspects, the system's one or more processors are further configured to generate the second distribution using a Deep Bidirectional BERT-style transformer. In some aspects, the knowledge corpus comprises one or more websites remote from the processing system.

In some aspects, the system's one or more processors are further configured to: generate an updated input vector by applying the first learned embedding function to the masked language modeling task, the first learned embedding function including one or more parameters modified in order to reduce a gradient of a log of the third distribution; generate an updated document vector for each document of a knowledge corpus by applying the second learned embedding function to each document of the knowledge corpus, the second learned embedding function including one or more parameters modified in order to reduce a gradient of a log of the third distribution; generate an updated relevance score for each given document of the knowledge corpus based on the updated input vector, and the updated document vector for the given document; and retrieve a third plurality of documents from the knowledge corpus based on the updated relevance score of each document in the third plurality of documents. Moreover, in such aspects, the system's one or more processors may be further configured to: generate an updated search index based on each updated document vector for each document of the knowledge corpus; and retrieve the third plurality of documents from the knowledge corpus based on a maximum inner product search based on the updated search index and the updated input vector.

In some aspects, the system's one or more processors are further configured to: receive a query task, the query task comprising an open-domain question and answering task; generate a query input vector by applying the first learned embedding function to the query task, the first learned embedding function including one or more parameters modified as a result of the modifying; generate a query relevance score for each given document of the knowledge corpus based on the query input vector, and the document vector for the given document; and retrieve a third plurality of documents from the knowledge corpus based on the query relevance score of each document in the third plurality of documents.

BRIEF DESCRIPTION OF THE DRAWINGS

FIG. 2 is a flow diagram of an exemplary method in accordance with aspects of the disclosure.

FIG. 3 is a flow diagram of an exemplary method in accordance with aspects of the disclosure.

FIG. 5 is a flow diagram of an exemplary method in accordance with aspects of the disclosure.

FIG. 9 is a flow diagram of an exemplary method in accordance with aspects of the disclosure.

DETAILED DESCRIPTION

The present technology will now be described with respect to the following exemplary systems and methods.

Example Systems

Figure 1:
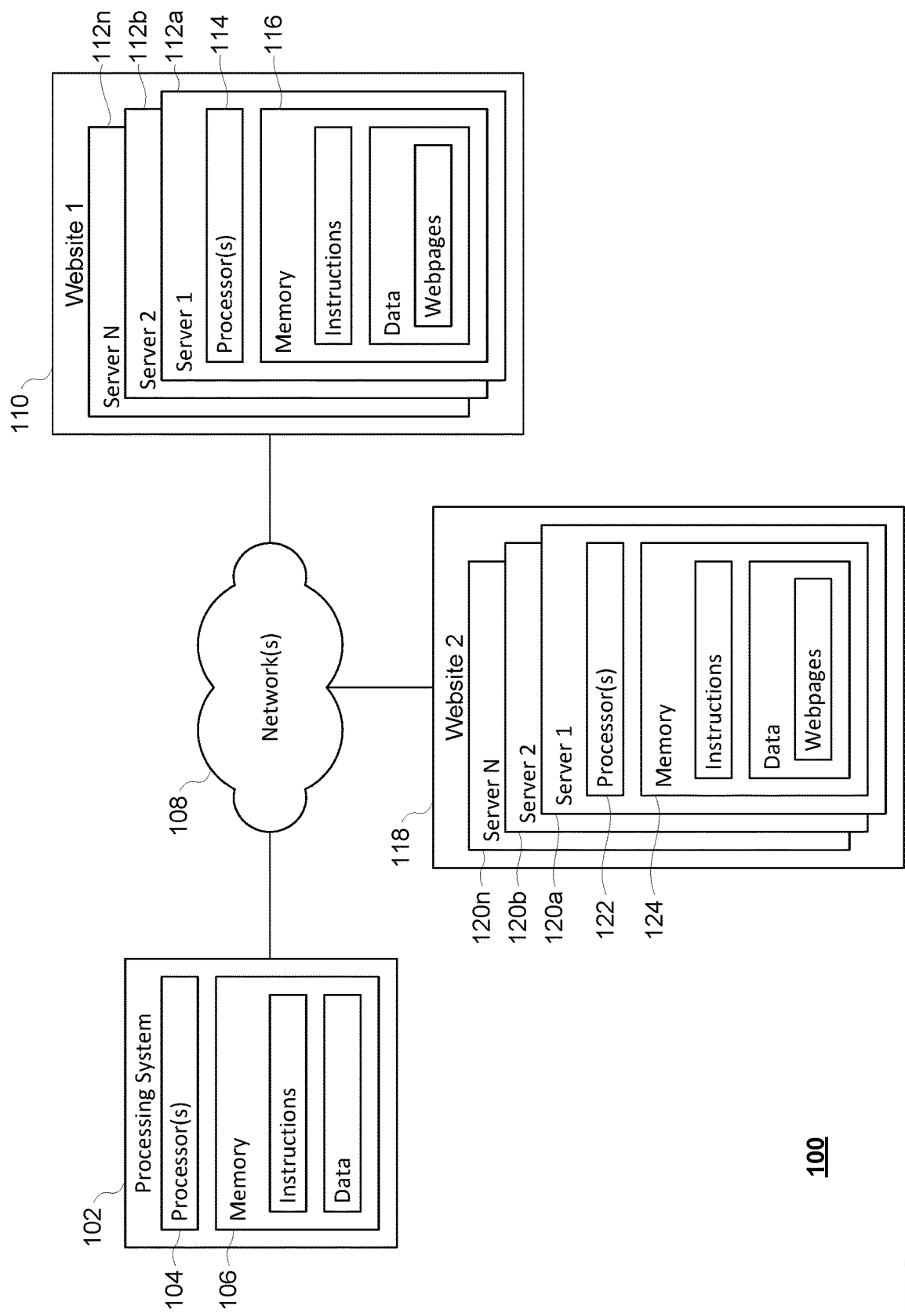
FIG. 1 is a functional diagram of an example system in accordance with aspects of the disclosure.

FIG. 1 schematically illustrates an arrangement 100 with an exemplary processing system 102 for performing the methods described herein. The processing system 102 may include one or more processors 104 and memory 106 storing instructions and data. In addition, the instructions and data may include the language model and knowledge retriever described herein. The processing system 102 is shown as a computing device which is in communication with various websites, including websites 110 and 118, over one or more networks 108. Exemplary websites 110 and 118 each include one or more servers 112a-112n and 120a-n, respectively. Each of the servers 112a-112n and 120a-n may have one or more processors (e.g., 114 and 122), and associated memory (e.g., 116 and 124) storing instructions and data, including the HTML of one or more webpages. The pre-training corpus X and/or the knowledge corpus Z, both discussed below, may be comprised of one or more such websites. However, various other topologies are also possible. For example, the processing system 102 may not be in direct communication with the websites, and may instead retrieve documents from stored versions of one or more websites. In other implementations, rather than websites or stored versions thereof, the pre-training corpus X and the knowledge corpus Z corpus may comprise one or more other sources of information such as databases, copies of literature, publications, newspapers, reference books, etc.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions and data that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

In addition to the systems described above and illustrated in the figures, various operations will now be described.

Pre-Training

According to aspects of the technology, a neural-network-based language model resident on processing system 102 is pre-trained using masked language modeling tasks. Each masked language modeling task may be automatically generated by a neural-network-based knowledge retriever (also resident on processing system 102), allowing pre-training to proceed unsupervised.

In that regard, FIG. 2 is a flow diagram of an exemplary process 200 that may be followed by the knowledge retriever to generate a masked language modeling task, in accordance with aspects of the disclosure. Thus, in step 202, the knowledge retriever retrieves a document from an unlabeled pre-training corpus X. As used herein, the term "document" may refer to a whole document or some portion thereof. For example, the pre-training corpus may be an online encyclopedia such as Wikipedia, and the retrieved document may be a complete HTML page for a given entry, a selected section or sections of the page (e.g., title, body, tables), a single paragraph or sentence, etc. In step 204, the knowledge retriever selects a passage of text from the document to be masked. For example, the knowledge retriever may select a single sentence from the document such as "The pound is the currency of the United Kingdom." Finally, in step 206, the knowledge retriever creates a masked language modeling task x by replacing one or more words of the selected passage with a masking token (e.g., "[MASK]" or any other suitable token). For example, continuing with the same example from step 204, the knowledge retriever may mask "pound" within the selected passage, such that masked language modeling task x becomes "The [MASK] is the currency of the United Kingdom."

In some aspects of the technology, the knowledge retriever may generate x by simply masking words at random. In some aspects of the technology, the knowledge retriever may utilize natural language processing to identify specific words or types of words deemed more salient such as names of people, countries, dates, etc. In addition, although FIG. 2 sets forth an exemplary process by which the knowledge retriever may generate the masked language modeling task x, in some aspects of the technology, a prearranged masked modeling task x may instead be provided to the knowledge retriever.

Once the masked language modeling task x has been generated or received by the knowledge retriever, the knowledge retriever will process both task x, and the documents of an unlabeled knowledge corpus Z, in order to identify a set of k potentially relevant documents to be used by the language model in predicting the missing tokens.

In that regard, FIG. 3 is a flow diagram of an exemplary process 300 that may be followed by the knowledge retriever to process masked modeling task x into a vector using a learned embedding function. Although any suitable embedding function may be used for this step, FIG. 3 sets forth one such example. In FIG. 3, after the knowledge retriever has received or generated the masked modeling task x (step 302), the knowledge retriever tokenizes the text of task x to create a tokenized version of x at step 304. More specifically, x is tokenized so that it begins with a prefix token (e.g., [CLS]) and each word of x (or segmented wordpiece thereof) is followed by a separator token (e.g., [SEP]). In such a case, if x is the passage "The [MASK] is the currency of the United Kingdom," then the tokenized version of x may be the following: "[CLS] The [SEP] [MASK] [SEP] is [SEP] the [SEP] currency [SEP] of [SEP] the [SEP] United [SEP] Kingdom [SEP]." In some aspects of the technology, x may be tokenized using wordpiece tokenization in which (where possible) its words may be further broken down into segments called wordpieces. For example, the word "United" may be broken down into [unite, ##d] and the word "Kingdom" may be broken down into [king, ##dom], in which "##" denotes that the wordpiece begins in the beginning of a word. In such a case, the example passage x discussed above may be tokenized into: "[CLS] The [SEP] [MASK] [SEP] is [SEP] the [SEP] currency [SEP] of [SEP] the [SEP] Unite [SEP] ##d [SEP] King [SEP] ##dom [SEP]."

Next, in step 306, the knowledge retriever transforms the tokenized version of x using a Deep Bidirectional BERT-style transformer. This yields a transformed version of x that includes a vector for each token. For example, the transformer may perform as described in Jacob Devlin, Ming-Wei Chang, Kenton Lee, Kristina Toutanova, *BERT: Pre-training of Deep Bidirectional Transformers for Language Understanding*, arXiv preprint arXiv:1810.04805, 2018. Finally, in step 308, the knowledge retriever performs a linear projection on the transformed version of x. In the example of FIG. 3, this is accomplished by multiplying the transformed version of x by a projection matrix to reduce its dimensionality to a d-dimensional vector, $\text{Embed}_{input}(x)$.

Figure 4:
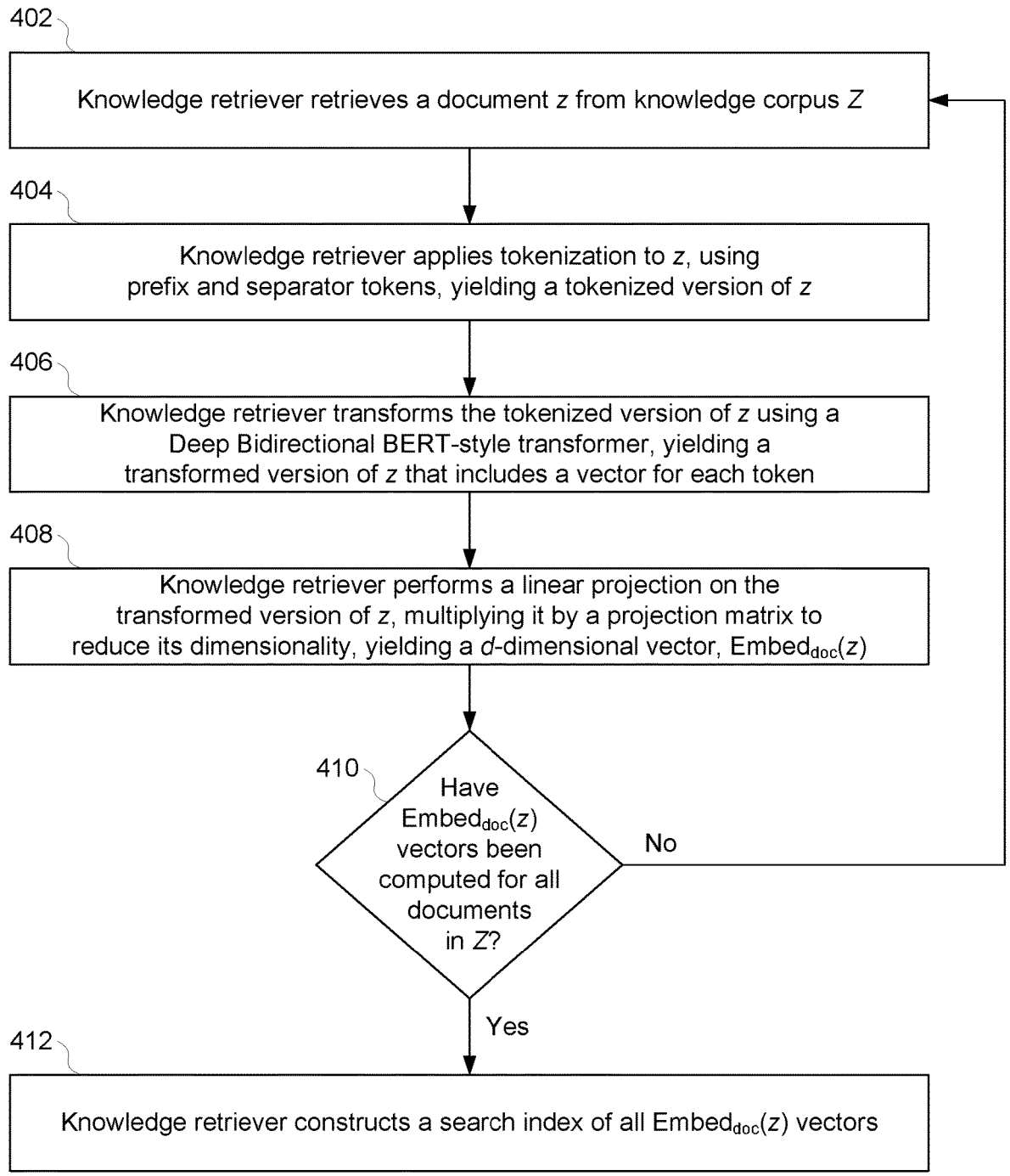
FIG. 4 is a flow diagram of an exemplary method in accordance with aspects of the disclosure.

Similarly, FIG. 4 is a flow diagram of an exemplary process 400 that may be followed by the knowledge retriever to process each document z in knowledge corpus Z into a vector using a learned embedding function. Here as well, although any suitable embedding function may be used for this step, FIG. 4 sets forth one such example. In FIG. 4, the knowledge retriever begins at step 402 by retrieving a document z from knowledge corpus Z. Knowledge corpus Z is an information source to be used by the language model in predicting tokens. For example, knowledge corpus Z may be an unlabeled corpus such as Wikipedia or some other website. In that regard, knowledge corpus Z may be the same as pre-training corpus X, may have only some overlap with pre-training corpus X, or may be completely different from pre-training corpus X In implementations where knowledge corpus Z is the same as pre-training corpus X, the particular document selected for generating masked language modeling task x may be removed from knowledge corpus Z before pre-training begins in order to avoid training the language model becoming too accustomed to finding answers through exact string matches.

In steps 404, 406, and 408, the knowledge retriever performs the same process of tokenizing, transforming, and linearly projecting the words of z as were performed in steps 304, 306, and 308 of FIG. 3. These steps may be performed as to all or a subset of the words in document z. For example, in some aspects of the technology, the words in both the title and the body of document z may be processed. In some aspects, only the words in the body of the document z or some subset thereof may be mapped. Thus, in step 404, the knowledge retriever tokenizes the text of task z to create a tokenized version of z. Again, z is tokenized using wordpiece tokenization so that it begins with a prefix token (e.g., [CLS]) and each word of z (or segmented wordpiece thereof) is followed by a separator token (e.g., [SEP]). In step 406, the knowledge retriever transforms the tokenized version of z using a Deep Bidirectional BERT-style transformer, yielding a transformed version of z that includes a vector for each token. In step 408, the knowledge retriever performs a linear projection on the transformed version of z by multiplying it by a projection matrix to reduce its dimensionality to a d-dimensional vector, $\text{Embed}_{doc}(z)$.

At step 410, the knowledge retriever determines whether it has computed an $\text{Embed}_{doc}(z)$ vector for every document in knowledge corpus Z. If not, the knowledge retriever returns to step 402, where it selects the next document from knowledge corpus Z, and proceeds to process that new document z as just described with respect to steps 404, 406, and 408. This process will repeat until, at step 410, the knowledge retriever determines that an $\text{Embed}_{doc}(z)$ vector has been computed for every document in knowledge corpus Z. Then, at step 412, the knowledge retriever will construct a search index of all of the computed $\text{Embed}_{doc}(z)$ vectors.

The knowledge retriever can compute a relevance score for a given document z by taking the inner product of the transpose of vector $\text{Embed}_{input}(x)$ created in FIG. 3 and a given $\text{Embed}_{doc}(z)$ vector created in step 408 of FIG. 4. In that regard, for a given masked modeling task x, the relevance score f(x, z) for a given document z is defined according to Equation 1, below.

$$f(x,z) = \text{Embed}_{input}(x)^T \text{Embed}_{doc}(z) \quad (1)$$

Equation 1 may thus be used in conjunction with the $\text{Embed}_{input}(x)$ vector created according to FIG. 3 and the search index of all $\text{Embed}_{doc}(z)$ vectors to identify the top k relevant documents for a given masked modeling task x.

FIG. 5 is a flow diagram of an exemplary process 500 that may be followed by the knowledge retriever to use the $\text{Embed}_{input}(x)$ and the search index of all $\text{Embed}_{doc}(z)$ vectors to identify and retrieve the top k documents. In step 502, the knowledge retriever employs a Maximum Inner Product Search (MIPS) algorithm using the $\text{Embed}_{input}(x)$ vector created according to FIG. 3 and the search index of all $\text{Embed}_{doc}(z)$ vectors created according step 412 to FIG. 4 to identify the top k relevant documents according to their individual relevance scores f(x, z). These individual relevance scores are computed according to Equation 1, above.

In step 504, the knowledge retriever normalizes the relevance scores f(x, z) of the top k documents using a softmax function to create a distribution p(z|x). More specifically, for each document z in the set of top k documents, the distribution p(z|x) will be the exponential of that document's relevance score divided by a summation of the relevance scores for each of the top k documents, as shown in Equation 2, below.

$$p(z|x) = \frac{\exp f(x, z)}{\sum_{z'} \exp(x, z')} \quad (2)$$

Finally, in step 506, the knowledge retriever will retrieve each of the top k documents for use by the language model. In some aspects of the technology, the knowledge retriever may be further configured to add an additional null document to the top k documents. In such cases, the null document has no content, and thus can be used to identify situations in which the language model would be able to correctly predict an answer without referencing any document. In that regard, if the language model is able to correctly predict an answer to x based on the null document, that indicates that the context of the masked modeling task x is informative enough by itself for the language model to predict the answer without consulting additional documents.

Once the language model receives the top k documents, the language model and knowledge retriever will perform the following steps to identify the likelihood of generating a given response y based on the set of k retrieved documents.

Figure 6:
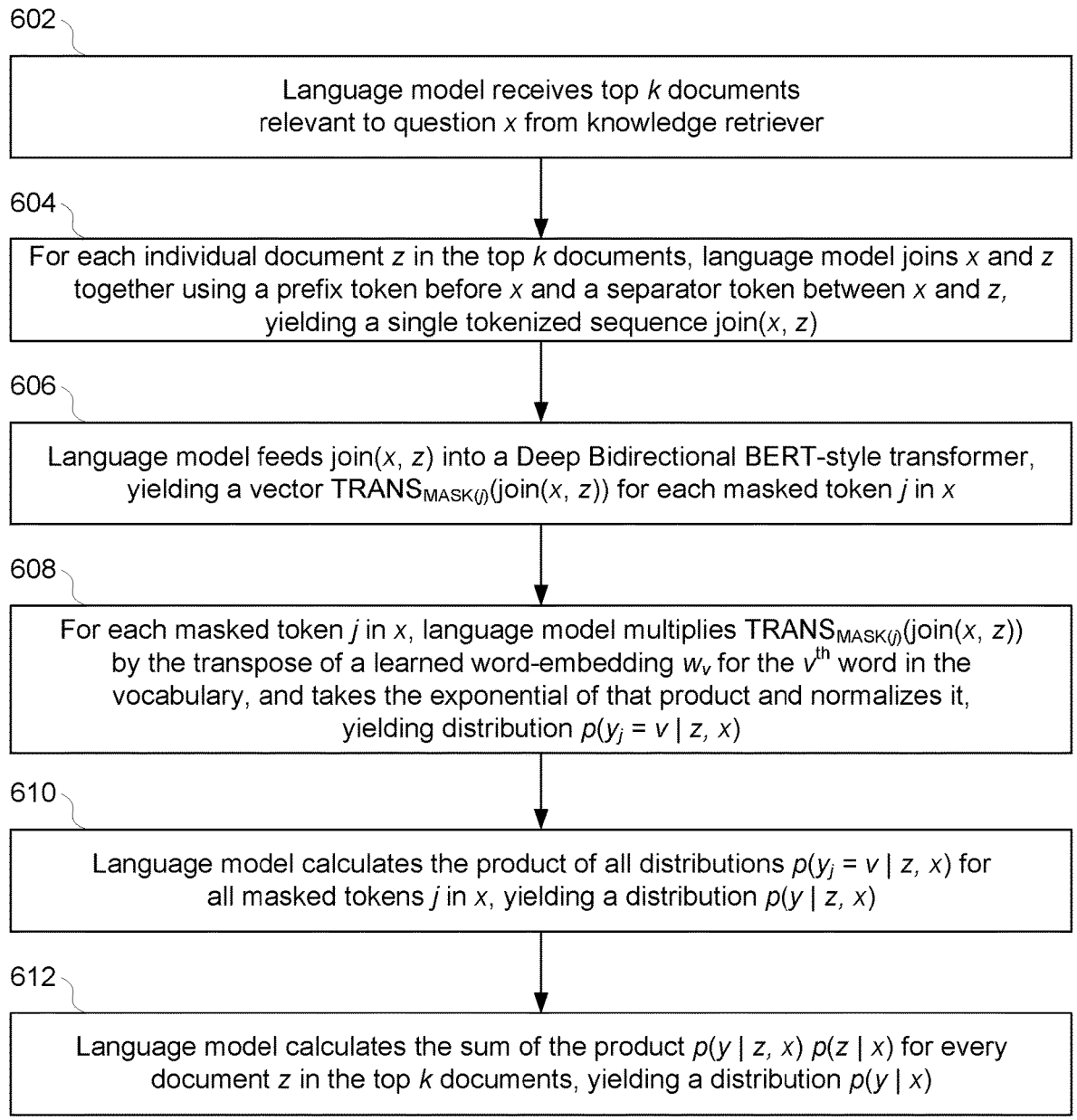
FIG. 6 is a flow diagram of an exemplary method in accordance with aspects of the disclosure.

In that regard, FIG. 6 is a flow diagram of an exemplary process 600 that may be followed by the language model to generate a distribution p(y|x) representing that likelihood during pre-training. In step 602, the language model receives the top k documents relevant to masked modeling task x from the knowledge retriever. Then, in step 604, for each individual document z in the top k documents, the language model joins x and z together into a single sequence using a prefix token (e.g., [CLS]) before x and a separator token (e.g., [SEP]) between x and z. This creates a single tokenized sequence join(x, z) for each document z. For example, if x is the passage "The [MASK] is the currency of the United Kingdom," and z is the passage "Pound sterling, known in some contexts simply as the pound or sterling, is the official currency of the United Kingdom," then the tokenized sequence join(x, z) may be: "[CLS] The [MASK] is the currency of the United Kingdom [SEP] Pound sterling, known in some contexts simply as the pound or sterling, is the official currency of the United Kingdom." In some aspects of the technology, the words in both the title and the body of each document z may be included in this tokenized sequence. In some aspects, only the words in the body of the document z or some subset thereof may be included in this tokenized sequence.

Next, in step 606, the language model feeds each join(x, z) sequence into a transformer to create a vector for each masked token in the sequence. This yields a vector $TRANS_{MASK(j)}(\text{join}(x, z))$ for each masked token j in x. This transformer must be distinct from the transformer used by the knowledge retriever. In the example of FIG. 6, the transformer is a Deep Bidirectional BERT-style transformer, but any suitable transformer may be used.

In step 608, the language model multiplies the $TRANS_{MASK(j)}(\text{join}(x, z))$ vector by the transpose of a learned word-embedding for that masked token. The word-embedding for the $v^{th}$ word in a vocabulary is represented as $w_v$ where the vocabulary has v={1, ..., V} entries. The embedding $w_v$ will be a vector representing that word or wordpiece from a learned word-embedding matrix which includes vectors for all known words or wordpieces in the language model's vocabulary. Multiplying the transpose of $w_v$ by $TRANS_{MASK(j)}(\text{join}(x, z))$ yields a vector of the same dimension as the language model's vocabulary. The language model then takes the exponential of that resulting vector, and normalizes it by dividing by the sum of the vector's elements for every entry v' from 1 to V, to create a distribution $p(y_j=v|z, x)$ representing the probability that the true value of the $j^{th}$ masked token is equal to the $v^{th}$ word in the vocabulary, having observed z and x, as shown in Equation 3, below.

$$p(y_j = v | z, x) = \frac{\exp(w_v^T TRANS_{MASK(j)}(\text{join}(x, z)))}{\sum_{v'=1}^{V} \exp(w_{v'}^T TRANS_{MASK(j)}(\text{join}(x, z)))} \quad (3)$$

In step 610, the language model then repeats the calculation of Equation 3 above for each masked token in x in order to calculate a distribution $p(y_j=v|z, x)$ for each masked token j in x. The language model then takes the product of each of those distributions $p(y_j|z, x)$ to create a final distribution p(y|z, x) representing its predictions regarding each possible output for all masked tokens in x, based on a given document z. Thus, for a sequence x with J masked tokens, the final distribution p(y|z, x) is defined according to Equation 4, below.

$$p(y | z, x) = \prod_{j=1}^{J} p(y_j = v | z, x) \quad (4)$$

Finally, in step 612, the language model uses the probability distributions created in step 610 of FIG. 6 and step 504 of FIG. 5 to generate a third probability distribution p(y|x). Probability distribution p(y|x) represents the overall likelihood for each possible output for all masked tokens in x, based on all of the documents z in the top k documents. This distribution is generated by treating z as a latent variable and marginalizing over all documents z (of the top k documents). Thus, p(y|x) is calculated by taking the sum of the product p(y|z, x) p(z|x) for every document z in the top k documents, as shown in Equation 5, below.

$$p(y | x) = \sum_{z \in Z} p(y | z, x) p(z | x) \quad (5)$$

Once the language model has determined p(y|x) for all of the documents z in the top k documents, the knowledge retriever can use that distribution to update the parameters of $Embed_{input}$ and $Embed_{doc}$. In that regard, the knowledge retriever will update the parameters of $Embed_{input}$ and $Embed_{doc}$ so that the log-likelihood, log p(y|x), is maximized for the correct output y (which will be known by the knowledge retriever, e.g., by virtue of it having generated each masked modeling task x as described above with respect to step 206 of FIG. 2). The knowledge retriever does this using stochastic gradient descent, in which the gradient of the log-likelihood, ∇log p(y|x), is iteratively recalculated as the individual relevance scores f(x, z) for each document z are increased or decreased based on whether a given document z is more or less informative than the average document in Z. For example, in some aspects of the technology, the knowledge retriever may increase or decrease the relevance scores f(x, z) for each document z by a multiplier r(z) defined according to Equation 6 below.

$$r(z) = \left[\frac{p(y|z, x)}{p(y|x)} - 1\right] p(z|x) \qquad (6)$$

As f(x, z) is the inner product of the transpose of $Embed_{input}(x)$ and $Embed_{doc}(z)$, the knowledge retriever implements these increases or decreases to f(x, z) by changing the parameters of the $Embed_{input}$ and $Embed_{doc}$ embedding functions. The knowledge retriever will continue revising the parameters of the $Embed_{input}$ and $Embed_{doc}$ embedding functions and recalculating $\nabla \log p(y|x)$ until log p(y x) has been maximized.

Figure 7:
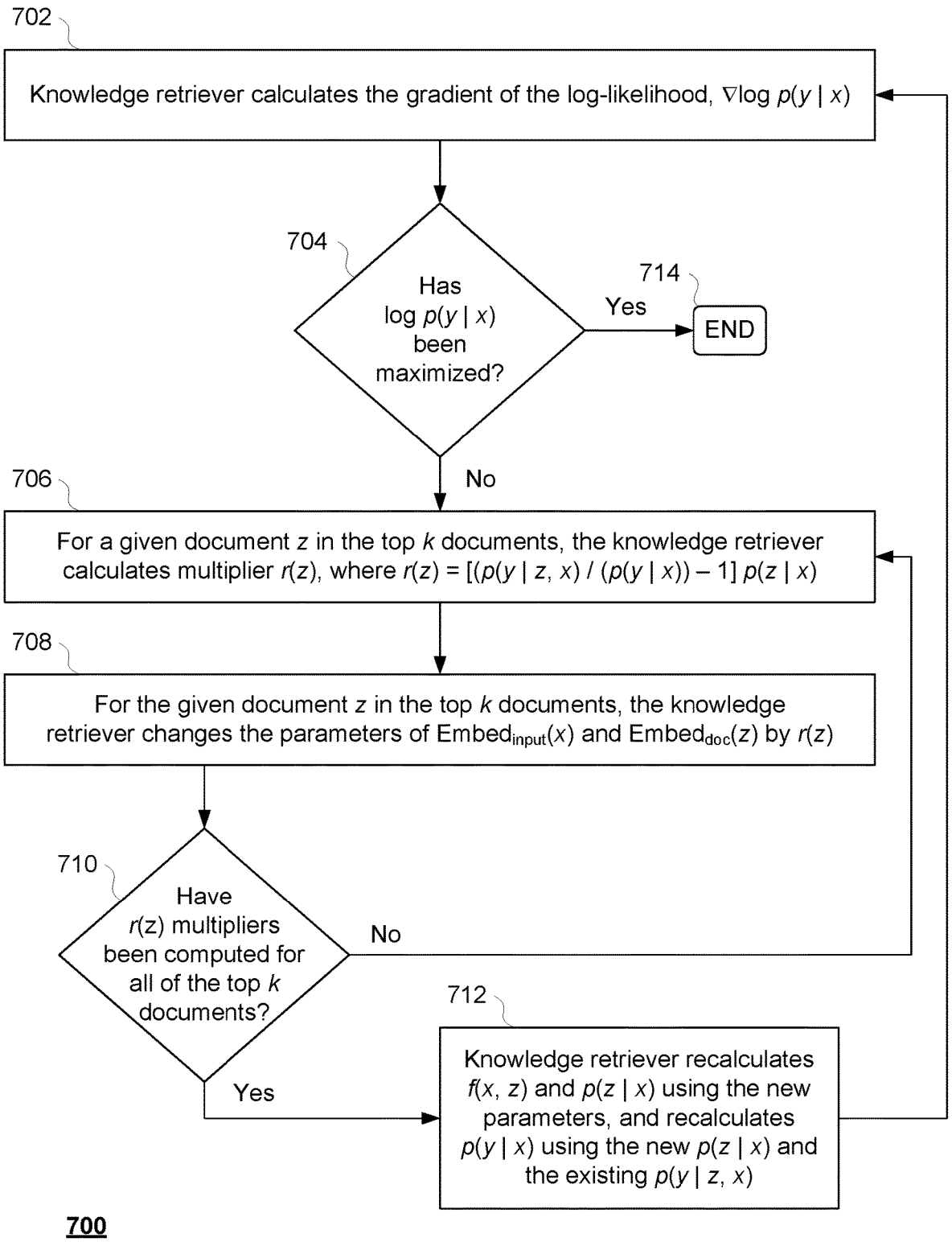
FIG. 7 is a flow diagram of an exemplary method in accordance with aspects of the disclosure.

FIG. 7 is flow diagram showing an exemplary method 700 for iteratively updating the relevance scores of each document z using multiplier r(z). In that regard, in step 702, the knowledge retriever calculates the gradient of the log-likelihood, $\nabla \log p(y|x)$.

In step 704, the knowledge retriever will determine whether log p(y|x) has been maximized, as approximated stochastically. In the first pass, as there will have been no prior $\nabla \log p(y|x)$ value calculated, this will always result in the knowledge retriever following the "no" arrow to step 706.

In step 706, for a given document z in the top k documents, the knowledge retriever calculates multiplier r(z) according to Equation 6 above. Then, in step 708, for that same document z, the knowledge retriever changes the parameters of $Embed_{input}(x)$ and $Embed_{doc}(z)$ by r(z). The present technology is not limited to methods and systems which use r(z) as defined in Equation 6. Thus, in some aspects of the technology, the knowledge retriever may increase or decrease $Embed_{input}(x)$ and $Embed_{doc}(z)$ based on other factors or multipliers, either in place of r(z) or in combination with r(z), and continue to backpropagate the changes (as shown in FIG. 7) until log p(y|x) has been maximized.

In step 710, the knowledge retriever checks whether r(z) multipliers have been computed for all documents in the top k documents. As shown by the "no" arrow connecting step 710 to step 706, this process will be repeated for each next document z until (at step 710), the knowledge retriever determines that r(z) multipliers have been computed for all documents z in the top k documents.

Once the condition of step 710 has been satisfied, the knowledge retriever will at step 712 recalculate f(x, z) and p(z|x) using the new parameters of the $Embed_{input}$ and $Embed_{doc}$ embedding functions (which were updated in each pass through step 708) according to Equations 1 and 2 above. The knowledge retriever will further use that recalculated p(z|x) distribution and the existing p(y|z, x) to recalculate p(y x) according to Equation 5 above. Then, as shown by the arrow connecting step 712 back to step 702, the knowledge retriever will return to step 702 where it will recalculate the gradient of the log-likelihood, $\nabla \log p(y|x)$, using the updated p(y|x) distribution calculated in step 712.

Thereafter, at step 704, the knowledge retriever will again check whether log p(y|x) has been maximized. If not, the knowledge retriever will proceed to step 706 again and the process will repeat. The knowledge retriever will successively loop through the steps of method 700 until, at step 704, a determination is made that log p(y|x) has been maximized. At that point, the process will end as shown by the "yes" arrow connecting step 704 to step 714.

As a result of the knowledge retriever updating the parameters of $Embed_{doc}$ during the stochastic gradient descent process just described, the search index of all vectors $Embed_{doc}(z)$ will become outdated. To address this, the knowledge retriever may periodically reapply the updated $Embed_{doc}$ function to each document z in knowledge corpus Z to create a new set of $Embed_{doc}(z)$ vectors, re-index those updated vectors to create a new search index, and recalculate the relevance scores using the updated index and updated $Embed_{input}$ embedding function. This allows the knowledge retriever to benefit from the updated parameters of $Embed_{input}$ and $Embed_{doc}$ when identifying new sets of the top k documents for new inputs x.

This updating process may be performed at any suitable interval, such as every 100 pre-training steps, or more or less. In some aspects of the technology, the knowledge retriever may perform the updating process in parallel with the knowledge retriever and language model continuing to perform pre-training steps. In such cases, the knowledge retriever and language model will proceed as described above, using the existing (outdated) $Embed_{input}(x)$ and $Embed_{doc}(z)$ vectors, search index, and relevance scores, while the embedding vectors, search index, and relevance scores are recomputed using a snapshot of the updated $Embed_{input}$ and $Embed_{doc}$ parameters.

Figure 8:
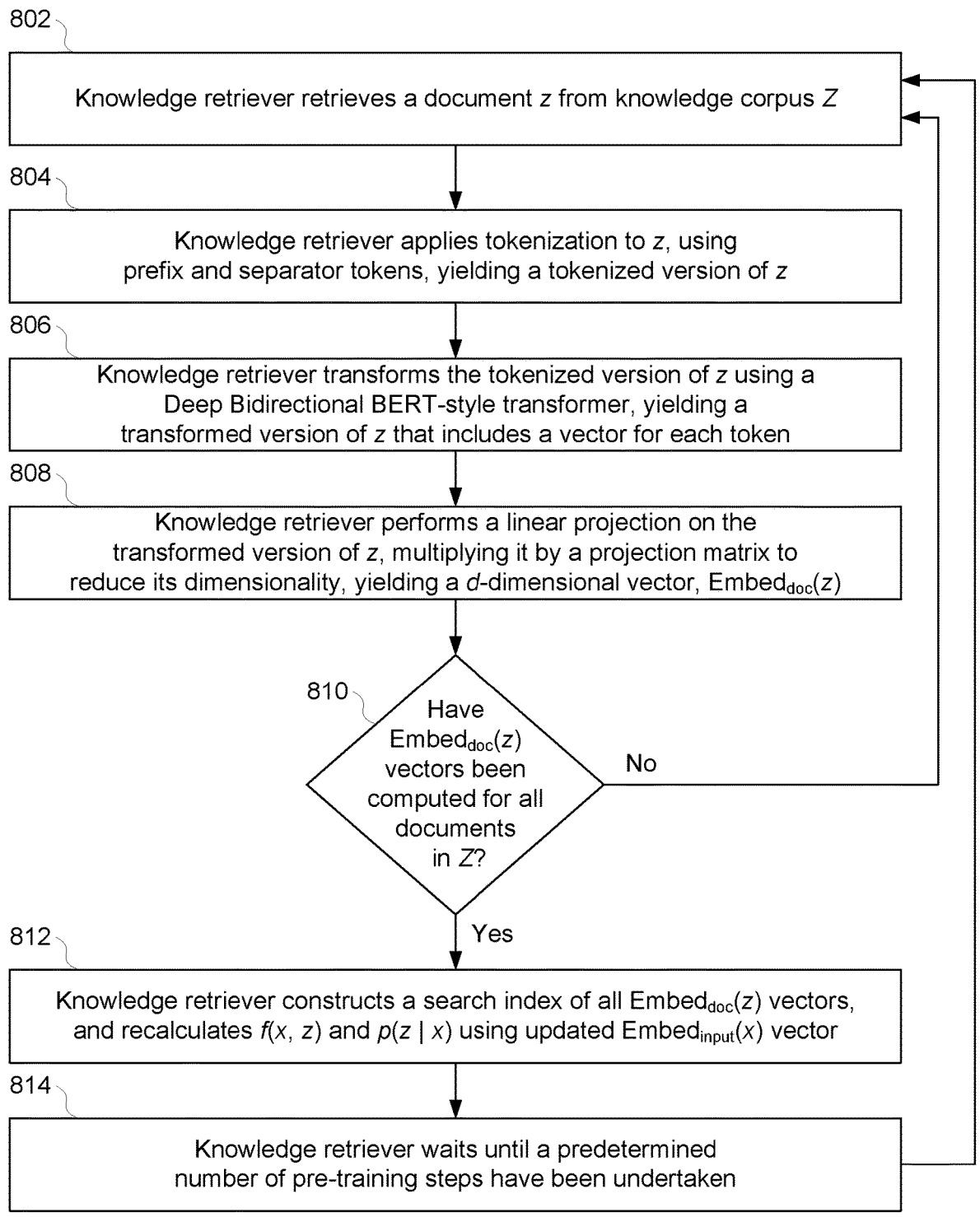
FIG. 8 is a flow diagram of an exemplary method in accordance with aspects of the disclosure.

FIG. 8 is flow diagram showing an exemplary method 800 for performing periodic updates of the $Embed_{input}(x)$ and $Embed_{doc}(z)$ vectors, search index, and relevance scores. In that regard, method 800 begins with steps 802-810, which are identical to steps 402-410 of FIG. 4, except that these steps will take place after an initial set of top k documents has been retrieved and processed according to the exemplary processes of FIGS. 4-7. Again, the steps of FIG. 8 may take place in parallel with those of FIG. 7. Thus, steps 802-810 describe a loop in which each document z in knowledge corpus Z is retrieved and processed in order to calculate its $Embed_{doc}(z)$ vector, this time using an updated version of the $Embed_{doc}$ embedding function with parameters that have been modified as a resulting of the processing described above with respect to FIG. 7. Once the loop represented by steps 802-810 has calculated updated $Embed_{doc}(z)$ vectors for all documents z in knowledge corpus Z, the knowledge retriever will proceed to step 812.

At step 812, the knowledge retriever will construct a search index of the updated $Embed_{doc}(z)$ vectors, and will also recalculate f(x, z) and p(z|x). The new f(x, z) scores and p(z|x) distribution will be calculated in the same way described above with respect to FIG. 5 and Equations 1 and 2, but will utilize a new $Embed_{input}(x)$ vector which has been calculated using an updated version of the $Embed_{input}$ embedding function with parameters that have been modified as a result of the processing described above with respect to FIG. 7. As stated above, these updated $Embed_{input}(x)$ and $Embed_{doc}(z)$ vectors, search index, relevance scores, and probability distributions can then be used going forward to retrieve new sets of the top k documents relevant to a given question x, and process them as described above with respect to FIGS. 5-7.

In addition, as shown in step 814, after some number of predetermined training steps have been undertaken with these updated $Embed_{input}(x)$ and $Embed_{doc}(z)$ vectors, search index, relevance scores, and probability distributions, the knowledge retriever will return to step 802 and begin the process of refreshing those values again.

In the exemplary methods of FIGS. 2-8 described above, the parameters of $Embed_{input}$ and $Embed_{doc}$ embedding functions may be randomly initialized, and may then be updated during model training through back-propagation. However, if the knowledge retriever uses $\text{Embed}_{input}$ and $\text{Embed}_{doc}$ as randomly initialized, it will initially retrieve a random set of documents which may be unrelated to x. In practice, this may lead to initial gradients for each document z that are not meaningful enough for the knowledge retriever to adequately learn how to improve its subsequent retrievals. To avoid this potential outcome, in some aspects of the technology, pre-training may begin with a simpler type of task prior to beginning the masked language modeling tasks described above.

For example, pre-training may begin with a set of Inverse Cloze Tasks in which x is a full sentence in a document z within knowledge corpus Z, and the knowledge retriever is initially trained to identify and retrieve that document z. By pre-training on a set of simpler tasks first, the parameters of $\text{Embed}_{input}$ and $\text{Embed}_{doc}$ can be improved such that the knowledge retriever will retrieve a more relevant set of documents during the first masked language modeling task, leading to better gradients, that in turn allow the knowledge retriever to identify even more relevant documents in subsequent retrievals. Where this option is employed, any suitable number of Inverse Cloze Tasks (e.g., 100,000 tasks, or more or less) may be performed prior to performing the pre-training steps described above with respect to FIGS. 2-8. Likewise, the pre-training processes described above with respect to FIGS. 2-8 may be performed for any suitable number of masked language modeling tasks x (e.g., 100,000 tasks, or more or less). In some aspects of the technology, pre-training using masked modeling tasks may continue until log p(z|x) has been maximized, or until diminishing improvement is seen in log p(z|x).

Fine-Tuning

Once the knowledge retriever and language model have been pre-trained as described above with respect to FIGS. 2-8, they may be fine-tuned using a different type of task. For example, in some aspects of the technology, the knowledge retriever and language model may be fine-tuned using a supervised set of open-domain question and answering examples. In these open-QA tasks, the language model is asked to predict answers to a set of direct questions (e.g., What is the capital of California?).

During fine-tuning using open-QA tasks, the knowledge retriever follows the same steps described above with respect to FIGS. 3 and 5 in order to identify the top k documents in knowledge corpus Z for use by the language model, except that it does so with respect to a supervised open-QA question x rather than a generated masked language modeling task. Thus, the knowledge retriever again maps the question x to a d-dimensional vector using the $\text{Embed}_{input}$ embedding function, as described above with respect to FIG. 3. Then, using the $\text{Embed}_{input}(x)$ vector together with the search index of all $\text{Embed}_{doc}(z)$ vectors (which already exist, from pre-training), the knowledge retriever again employs a MIPS algorithm to identify the top k documents according to their relevance scores f(x, z), as described above with respect to Equation 1 and step 502 of FIG. 5. Next, the knowledge retriever normalizes the relevance scores of the top k documents using a softmax function to create a distribution p(z|x), as described above with respect to Equation 2 and step 504 of FIG. 5. Finally, the knowledge retriever will retrieve the top k documents for use by the language model in answering open-QA task x, as described above with respect to step 506 of FIG. 5. Here as well, in some implementations, the knowledge retriever may be further programmed to add an additional null document to the top k documents, for the purposes described above.

Unlike the knowledge retriever, the language model follows slightly different steps during fine-tuning than it did during pre-training. In that regard, FIG. 9 is a flow diagram of an exemplary process 900 that may be followed by the language model to generate a distribution p(y|x) during fine-tuning. The method of FIG. 9 begins, at step 902, with the language model receiving the top k documents relevant to open-QA task x. These are the documents that were identified and retrieved by the knowledge retriever pursuant to the method of FIG. 5.

In step 904, the language model identifies all possible spans of text that exist in the body text of document z. For a given span y, the language model identifies the set of spans S(z, y) that match span y in document z. The language model then processes the text of the body of document z, and inserts a start token and an end token at the beginning and end of every instance s of that span of text.

In step 906, the language model joints the tokenized body text of document z with the text of the open-QA task x to form a single tokenized sequence, join(x, z). This may be done as described above with respect to step 604 of FIG. 6, using a prefix token (e.g., [CLS]) and a separator token (e.g., [SEP]) between every word or wordpiece.

In steps 908 and 910, the language model feeds the resulting tokenized sequence, join(x, z), into two separate transformers that will create a vector corresponding to the start and end tokens for each individual instance s of that span y in join(x, z). In Equations 7 and 8 below, the transformer that creates the start vector $h_{START(s)}$ for a given instance s of the span is represented as $\text{TRANS}_{START(s)}(\ )$, and the transformer that creates the end vector $h_{END(s)}$ for a given instance s of the span is represented as $\text{TRANS}_{END(s)}(\ )$ Here again, each of these transformers must be distinct from the transformer used by the knowledge retriever, but otherwise may be any suitable type of transformer, including a Deep Bidirectional BERT-style transformer.

$$h_{START(s)} = \text{TRANS}_{START(s)}(\text{join}(x,z)) \quad (7)$$

$$h_{END(s)} = \text{TRANS}_{END(s)}(\text{join}(x,z)) \quad (8)$$

In step 912, once the language model has generated the entire set of start and end vectors for every instance s of span y in the set S(z, y), each pair of $h_{START(s)}$ and $h_{END(s)}$ vectors are connected to a feed-forward multi-layer perceptron (MLP) neural network. In addition, the language model takes the sum of the exponentials of the MLP outputs, and normalizes it by dividing by the sum of the exponentials of the MLP outputs for every instance of span s' in the set of all spans S(z) in document z in order to create a distribution p(y z, x). Thus, for a given span y in document z, the fine-tuning distribution p(y|z, x) is defined according to Equation 9, below.

$$p(y \mid z, x) = \frac{\sum_{s \in S(z,y)} \exp(MLP([h_{START(s)}; h_{END(s)}]))}{\sum_{s' \in S(z)} \exp(MLP([h_{START(s')}; h_{END(s')}]))} \quad (9)$$

Finally, in step 914, the language model uses the probability distributions created in step 912 of FIG. 9 and step 504 of FIG. 5 to generate a third probability distribution p(y|x). Probability distribution p(y|x) is calculated by taking the sum of the product p(y|z, x) p(z|x) for every document z in the top k documents, as described above with respect to Equation 5 and step 612 of FIG. 6.

In some aspects of the technology, during fine-tuning, the knowledge retriever may follow the same process described above with respect to FIG. 7 to update the parameters of both $Embed_{input}$ and $Embed_{doc}$ so that the log-likelihood, log p(y x), is maximized for the correct output y (which is provided as part of the supervised open-QA training examples). In such a case, the knowledge retriever will again use stochastic gradient descent to iteratively recalculate $\nabla$log p(y|x) as the individual relevance scores f(x, z) for each document z are increased or decreased according to multiplier r(z), defined in Equation 6 above. Likewise, the knowledge retriever will continue revising the parameters of the $Embed_{input}$ and $Embed_{doc}$ embedding functions and recalculating $\nabla$log p(y|x) until log p(y|x) has been maximized. In addition, in some aspects of the technology, the knowledge retriever may further be configured to periodically update the $Embed_{input}(x)$ and $Embed_{doc}(z)$ vectors, search index, relevance scores, and probability distributions during fine-tuning in the same manner described above with respect to FIG. 8.

Figure 10:
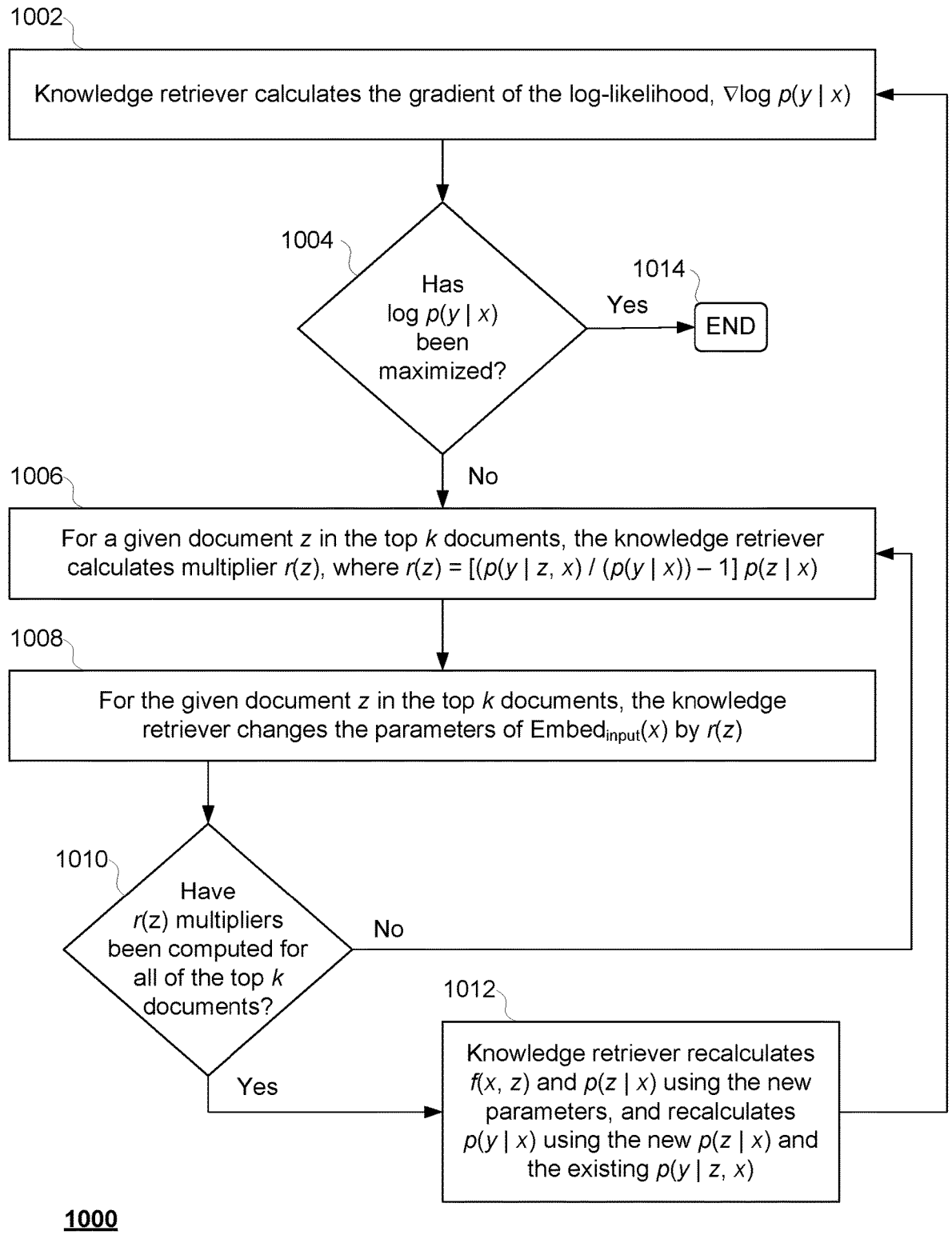
FIG. 10 is a flow diagram of an exemplary method in accordance with aspects of the disclosure.

In some aspects of the technology, the knowledge retriever may instead be configured to only make changes to the parameters of $Embed_{input}$ during fine-tuning. In that regard, FIG. 10 is a is a flow diagram showing an exemplary method 1000 for iteratively updating the relevance scores of each document by making changes only to the parameters of $Embed_{input}$. The exemplary method of FIG. 10 is identical to that of FIG. 7, except that in step 1008, the knowledge retriever only changes the parameters of $Embed_{input}(x)$ by the r(z) multiplier defined in Equation 6, above. However, here again, the present technology is not limited to methods and systems which use r(z) as defined in Equation 6. Thus, in some aspects of the technology, the knowledge retriever may increase or decrease $Embed_{input}(x)$ based on other factors or multipliers, either in place of r(z) or in combination with r(z), and continue to backpropagate the changes (as shown in FIG. 10) until log p(y|x) has been maximized.

Figure 11:
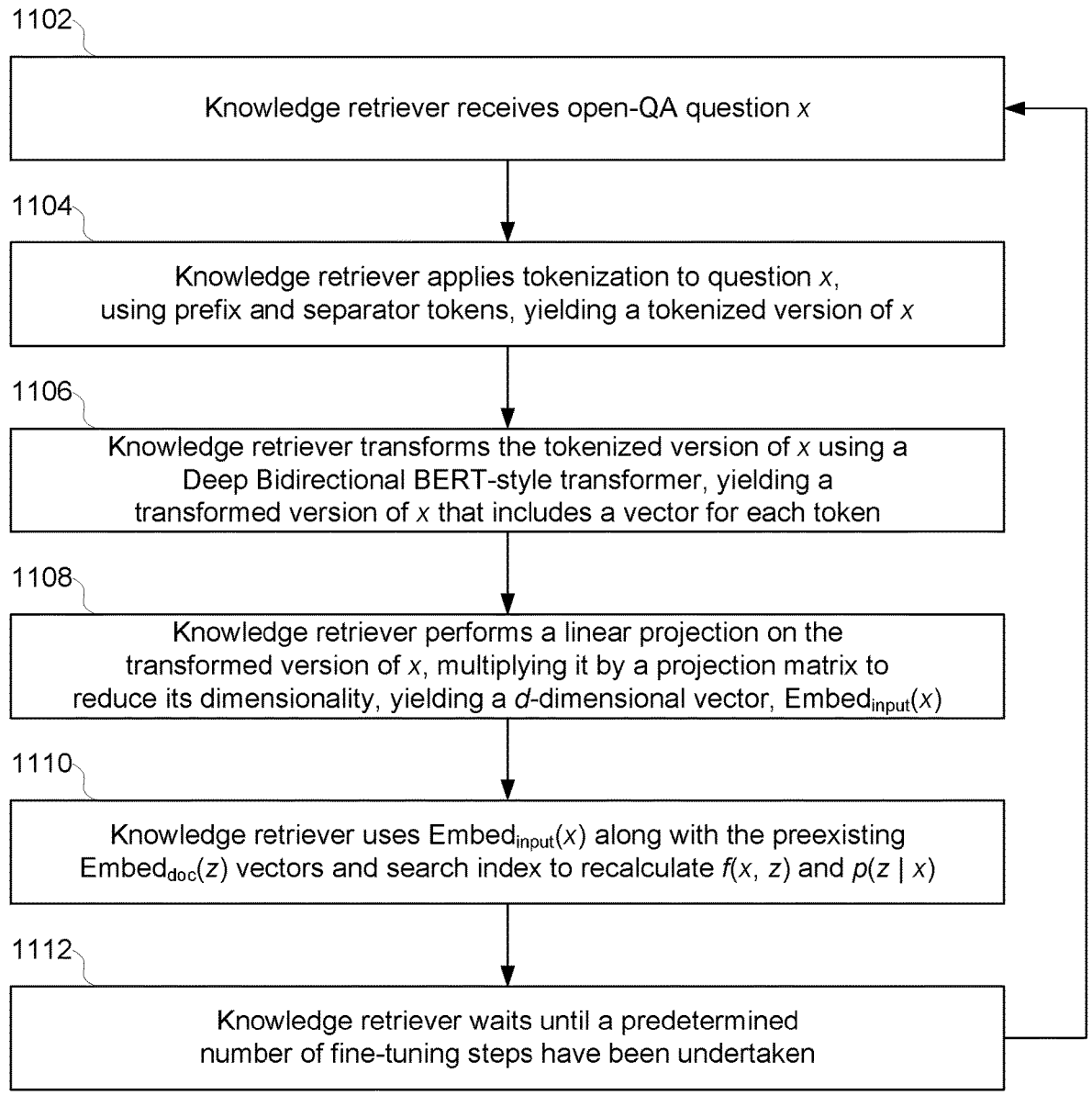
FIG. 11 is a flow diagram of an exemplary method in accordance with aspects of the disclosure.

In the example of FIG. 10, because changes are only made to the parameters of $Embed_{input}$, the search index does not need to be refreshed. However, in some aspects of the technology, the knowledge retriever may still be configured to periodically update the $Embed_{input}(x)$ values with those calculated in step 1008 so that they can be used (along with the pre-existing search index and $Embed_{doc}(z)$ vectors) to improve the relevance of the retrieval function from the query side. In that regard, FIG. 11 is flow diagram showing an exemplary method 1100 for performing periodic updates of the $Embed_{input}(x)$ vector, relevance scores, and probability distributions during fine-tuning.

The first five steps of method 1100 recite the same operations described above for initially processing the words of an open-QA task x. However, the steps of method 1100 will take place after an initial round of fine-tuning has taken place, and thus after f(x, z) and p(z|x) have been calculated using an outdated $Embed_{input}(x)$ vector. Thus, in step 1102, the knowledge retriever receives the open-QA task x. In step 1104, the knowledge retriever tokenizes the words or word-pieces of question x, using prefix and separator tokens, as described above with respect to step 304 of FIG. 3. In step 1106, the knowledge retriever transforms the tokenized version of x using a Deep Bidirectional BERT-style transformer, yielding a transformed version of x that includes a vector for each token, as described above with respect to step 306 of FIG. 3. In step 1108, the knowledge retriever performs a linear projection on the transformed version of x, multiplying it by a projection matrix to reduce its dimensionality, yielding a d-dimensional vector, $Embed_{input}(x)$, as described above with respect to step 308 of FIG. 3.

Then, in step 1110, the knowledge retriever recalculates f(x, z) and p(z|x). These new f(x, z) scores and p(z|x) distribution will be calculated in the same way described above with respect to FIG. 5 and Equations 1 and 2, but will utilize a new $Embed_{input}(x)$ vector which has been calculated using an updated version of the $Embed_{input}$ embedding function with parameters that have been modified as a result of the processing described above with respect to FIG. 10. This updated $Embed_{doc}(x)$ vector and the updated relevance scores and probability distribution can then be used going forward to retrieve new sets of the top k documents relevant to a given question x, and process them as described above with respect to FIGS. 5, 9, and 10.

Finally, as shown in step 1112, after some number of predetermined fine-tuning steps have been undertaken with this updated $Embed_{doc}(x)$ vector, and updated relevance scores and probability distribution, the knowledge retriever will return to step 1102 and begin the process of refreshing those values again.

Figure 12:
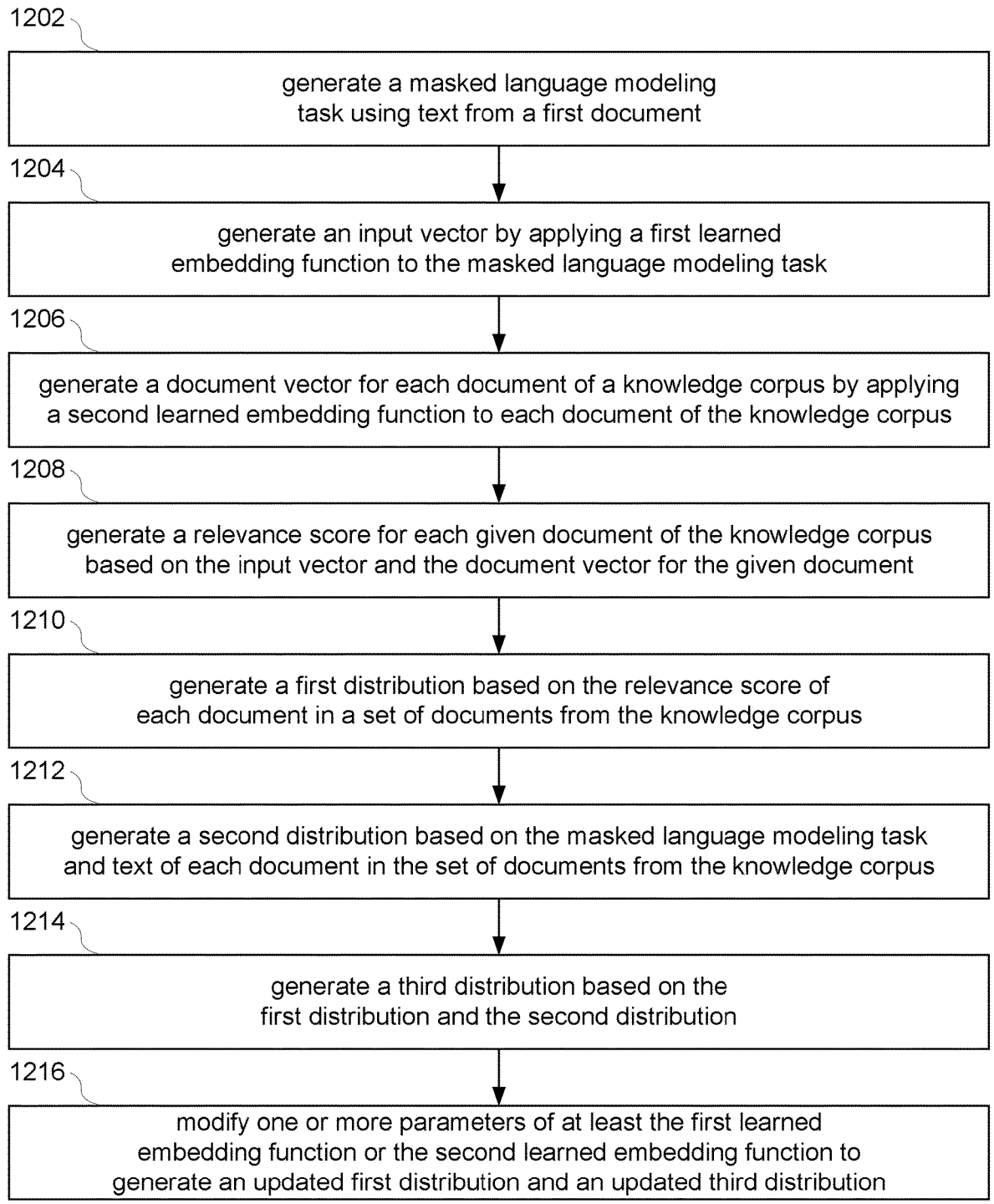
FIG. 12 is a flow diagram of an exemplary method in accordance with aspects of the disclosure.

FIG. 12 is a flow diagram showing an exemplary method 1200 of pre-training a neural-network-based language model resident on processing system 102, in accordance with aspects of the disclosure. In that regard, in step 1202, the processing system 102 generates a masked language modeling task using text from a first document, for example as described above with respect to FIG. 2. In step 1204, the processing system 102 generates an input vector by applying a first learned embedding function to the masked language modeling task, for example as described above with respect to FIG. 3. In step 1206, the processing system 102 generates a document vector for each document of a knowledge corpus by applying a second learned embedding function to each document of the knowledge corpus, for example as described above with respect to FIG. 4. In step 1208, the processing system 102 generates a relevance score for each given document of the knowledge corpus based on the input vector and the document vector for the given document, for example as described above with respect to step 502 of FIG. 5. In step 1210, the processing system 102 generates a first distribution based on the relevance score of each document in a set of documents from the knowledge corpus, for example as described above with respect to step 504 of FIG. 5. In some aspects, to identify this set of documents, the processing system 102 may generate a search index based on each document vector for each document of the knowledge corpus, and employ a maximum inner product search based on the search index and the input vector, for example as described above with respect to FIG. 5. In step 1212, the processing system 102 generates a second distribution based on the masked language modeling task and text of each document in the set of documents from the knowledge corpus, for example as described above with respect to steps 602-610 of FIG. 6. In step 1214, the processing system 102 generates a third distribution based on the first distribution and the second distribution, for example as described above with respect to step 612 of FIG. 6. In step 1216, the processing system 102 modifies one or more parameters of at least the first learned embedding function or the second learned embedding function to generate an updated first distribution and an updated third distribution, for example as described above with respect to FIG. 7.

Figure 13:
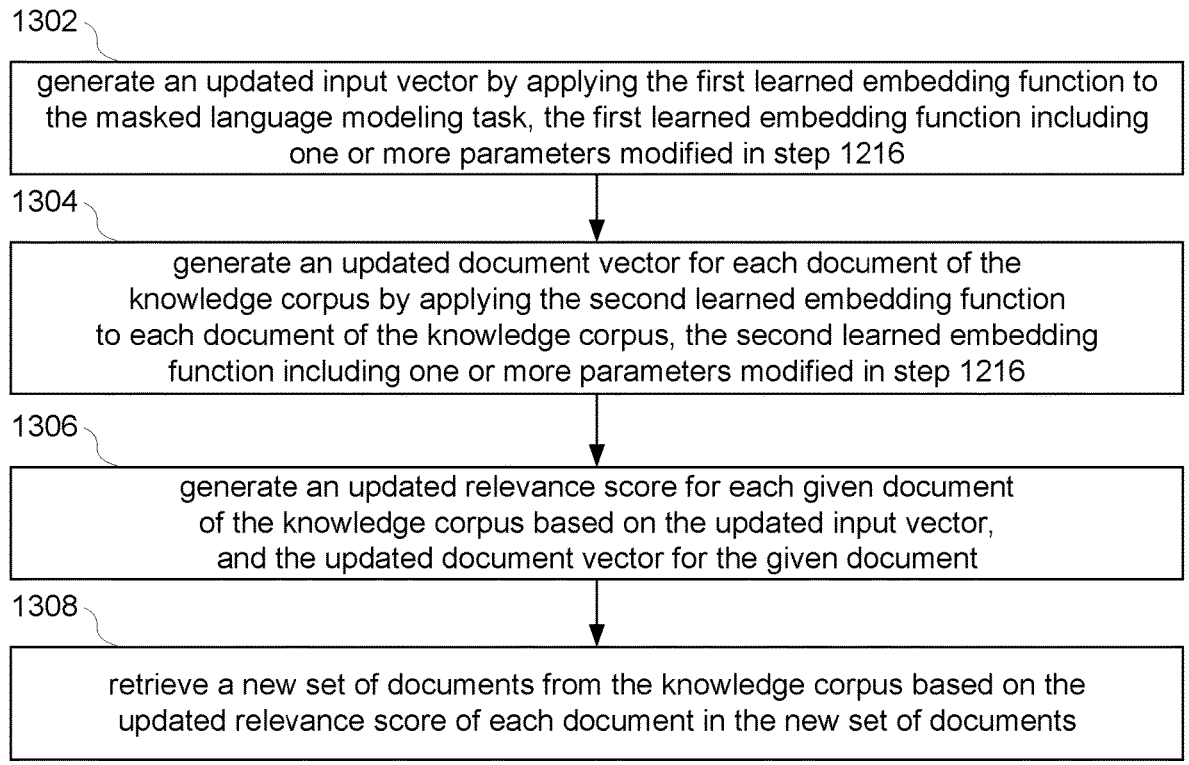
FIG. 13 is a flow diagram of an exemplary method in accordance with aspects of the disclosure.

FIG. 13 is a flow diagram showing an exemplary method 1300 to continue the pre-training of the neural-network-based language model resident on processing system 102, in accordance with aspects of the disclosure. Method 1300 is a continuation of the steps described above with respect to method 1200 of FIG. 12. In that regard, in step 1302, the processing system 102 generates an updated input vector by applying the first learned embedding function to the masked language modeling task, the first learned embedding function including one or more parameters modified in step 1216. For example, the processing system 102 may generate the updated input vector as described above with respect to FIG. 3 and step 712 of FIG. 7. In step 1304, the processing system 102 generates an updated document vector for each document of the knowledge corpus by applying the second learned embedding function to each document of the knowledge corpus, the second learned embedding function including one or more parameters modified in step 1216. For example, the processing system 102 may generate the updated document vectors as described above with respect to FIG. 4 and steps 802-810 of FIG. 8. In step 1306, the processing system 102 generates an updated relevance score for each given document of the knowledge corpus based on the updated input vector, and the updated document vector for the given document, for example as described above with respect to step 812 of FIG. 8. In step 1308, the processing stem retrieves a new set of documents from the knowledge corpus based on the updated relevance score of each document in the second plurality of documents, for example as described above with respect to FIG. 5. In some aspects, to identify and retrieve this new set of documents, the processing system 102 may generate an updated search index based on each updated document vector for each document of the knowledge corpus, and employ a maximum inner product search based on the updated search index and the updated input vector, for example as described above with respect to FIG. 5.

Figure 14:
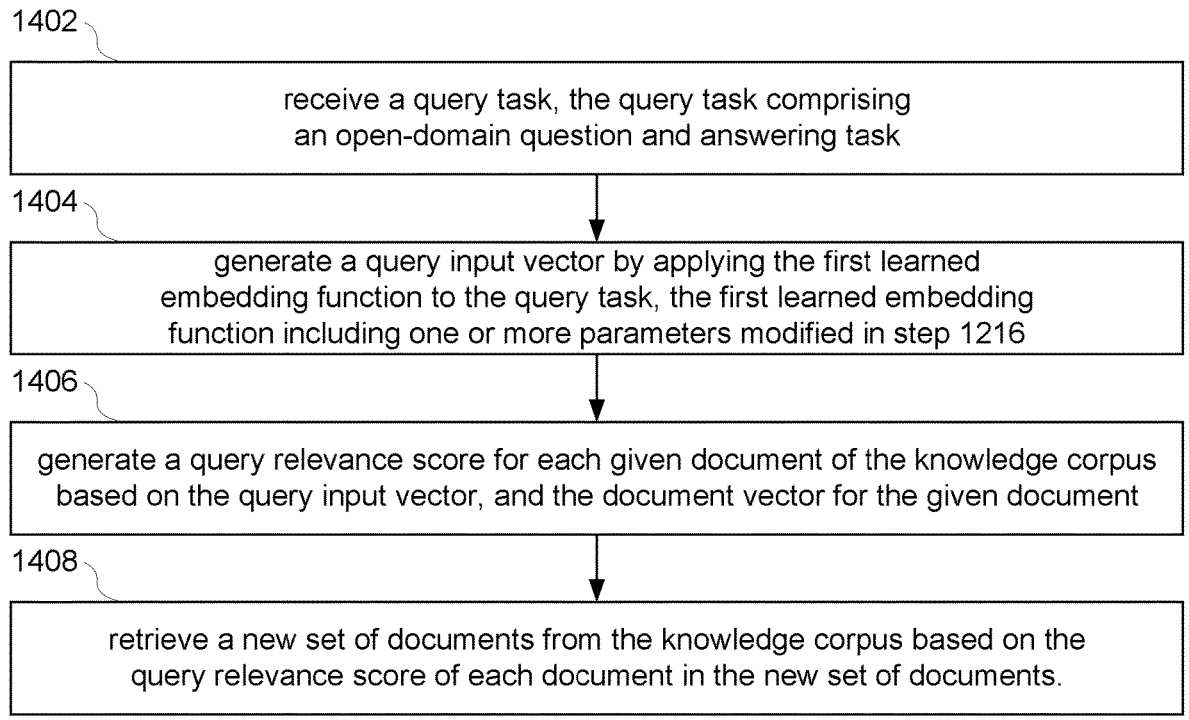
FIG. 14 is a flow diagram of an exemplary method in accordance with aspects of the disclosure.

FIG. 14 is a flow diagram showing an exemplary method 1400 of fine-tuning the neural-network-based language model resident on processing system 102, in accordance with aspects of the disclosure. Method 1400 is a continuation of the steps described above with respect to method 1200 of FIG. 12 (or method 1200 of FIG. 12 and method 1300 of FIG. 13). In that regard, in step 1402, the processing system 102 receives a query task comprising an open-domain question and answering task as described above. In step 1404, the processing system 102 generates a query input vector by applying the first learned embedding function to the query task, the first learned embedding function including one or more parameters modified in step 1216. For example, the processing system 102 may generate the query input vector in the manner described above with respect to steps 304-308 of FIG. 3. In step 1406, the processing system 102 generates a query relevance score for each given document of the knowledge corpus based on the query input vector, and the document vector for the given document (as calculated previously in step 1206 (or step 1304)). For example, the query relevance score may be generated in the manner described above with respect to step 502 of FIG. 5. In step 1408, the processing system 102 retrieves a new set of documents from the knowledge corpus based on the query relevance score of each document in the new set of documents, for example, as described above with respect to step 506 of FIG. 5. Here as well, in some aspects, to identify and retrieve this new set of documents, the processing system 102 may use a search index based on the document vector for each document of the knowledge corpus, and employ a maximum inner product search based on the search index and the query input vector, for example as described above with respect to FIG. 5.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method of training a language model, comprising:
    generating, using one or more processors of a processing system, a masked language modeling task using text from a first document;
    generating, using the one or more processors, an input vector by applying a first learned embedding function to the masked language modeling task;
    generating, using the one or more processors, a document vector for each document of a knowledge corpus by applying a second learned embedding function to each document of the knowledge corpus, the knowledge corpus comprising a first plurality of documents;
    generating, using the one or more processors, a relevance score for each given document of the knowledge corpus based on the input vector and the document vector for the given document;
    generating, using the one or more processors, a first distribution based on the relevance score of each document in a second plurality of documents, the second plurality of documents being from the knowledge corpus;
    generating, using the one or more processors, a second distribution based on the masked language modeling task and text of each document in the second plurality of documents;
    generating, using the one or more processors, a third distribution based on the first distribution and the second distribution; and
    modifying, using the one or more processors, one or more parameters of at least the first learned embedding function or the second learned embedding function to generate an updated first distribution and an updated third distribution.

2. The method of claim 1, wherein the second plurality of documents is a subset of the first plurality of documents.

3. The method of claim 1, further comprising:
    generating, using the one or more processors, an updated input vector by applying the first learned embedding function to the masked language modeling task, the first learned embedding function including one or more parameters modified as a result of the modifying;
    generating, using the one or more processors, an updated document vector for each document of the knowledge corpus by applying the second learned embedding function to each document of the knowledge corpus, the second learned embedding function including one or more parameters modified as a result of the modifying;

generating, using the one or more processors, an updated relevance score for each given document of the knowledge corpus based on the updated input vector, and the updated document vector for the given document; and retrieving, using the one or more processors, a third plurality of documents from the knowledge corpus based on the updated relevance score of each document in the third plurality of documents.

4. The method of claim 1, further comprising:

generating, using the one or more processors, a search index based on each document vector for each document of the knowledge corpus; and identifying, using the one or more processors, the second plurality of documents based on a maximum inner product search based on the search index and the input vector.

5. The method of claim 3, further comprising:

generating, using the one or more processors, an updated search index based on each updated document vector for each document of the knowledge corpus; and wherein retrieving the third plurality of documents from the knowledge corpus based on the updated relevance score of each document in the third plurality of documents further comprises employing a maximum inner product search based on the updated search index and the updated input vector.

6. The method of claim 1, further comprising:

receiving, using the one or more processors, a query task, the query task comprising an open-domain question and answering task;

generating, using the one or more processors, a query input vector by applying the first learned embedding function to the query task, the first learned embedding function including one or more parameters modified as a result of the modifying;

generating, using the one or more processors, a query relevance score for each given document of the knowledge corpus based on the query input vector, and the document vector for the given document; and retrieving, using the one or more processors, a third plurality of documents from the knowledge corpus based on the query relevance score of each document in the third plurality of documents.

7. The method of claim 1, wherein the first learned embedding function comprises a Deep Bidirectional BERT-style transformer.

8. The method of claim 1, wherein the second learned embedding function comprises a Deep Bidirectional BERT-style transformer.

9. The method of claim 1, wherein generating the second distribution further comprises processing, by the one or more processors, the masked language modeling task and text of each document in the second plurality of documents using a Deep Bidirectional BERT-style transformer.

10. The method of claim 1, wherein the knowledge corpus comprises one or more websites remote from the processing system.

11. A processing system for performing natural language processing, comprising:

a memory; and one or more processors coupled to the memory and configured to:

generate a masked language modeling task using text from a first document;

generate an input vector by applying a first learned embedding function to the masked language modeling task;

generate a document vector for each document of a knowledge corpus by applying a second learned embedding function to each document of the knowledge corpus, the knowledge corpus comprising a first plurality of documents;

generate a relevance score for each given document of the knowledge corpus based on the input vector and the document vector for the given document;

generate a first distribution based on the relevance score of each document in a second plurality of documents, the second plurality of documents being from the knowledge corpus;

generate a second distribution based on the masked language modeling task and text of each document in the second plurality of documents;

generate a third distribution based on the first distribution and the second distribution; and modify one or more parameters of at least the first learned embedding function or the second learned embedding function to generate an updated first distribution and an updated third distribution.

12. The system of claim 11, wherein the second plurality of documents is a subset of the first plurality of documents.

13. The system of claim 11, wherein the one or more processors are further configured to:

generate an updated input vector by applying the first learned embedding function to the masked language modeling task, the first learned embedding function including one or more parameters modified in order to reduce a gradient of a log of the third distribution;

generate an updated document vector for each document of a knowledge corpus by applying the second learned embedding function to each document of the knowledge corpus, the second learned embedding function including one or more parameters modified in order to reduce a gradient of a log of the third distribution;

generate an updated relevance score for each given document of the knowledge corpus based on the updated input vector, and the updated document vector for the given document; and retrieve a third plurality of documents from the knowledge corpus based on the updated relevance score of each document in the third plurality of documents.

14. The system of claim 11, wherein the one or more processors are further configured to:

generate a search index based on each document vector for each document of the knowledge corpus; and identify the second plurality of documents based on a maximum inner product search based on the search index and the input vector.

15. The system of claim 13, wherein the one or more processors are further configured to:

generate an updated search index based on each updated document vector for each document of the knowledge corpus; and retrieve the third plurality of documents from the knowledge corpus based on a maximum inner product search based on the updated search index and the updated input vector.

16. The system of claim 11, wherein the one or more processors are further configured to:

receive a query task, the query task comprising an open-domain question and answering task;

generate a query input vector by applying the first learned embedding function to the query task, the first learned embedding function including one or more parameters modified as a result of the modifying;

generate a query relevance score for each given document of the knowledge corpus based on the query input vector, and the document vector for the given document; and retrieve a third plurality of documents from the knowledge corpus based on the query relevance score of each document in the third plurality of documents.

17. The system of claim 11, wherein the first learned embedding function comprises a Deep Bidirectional BERT-style transformer.

18. The system of claim 11, wherein the second learned embedding function comprises a Deep Bidirectional BERT-style transformer.

19. The system of claim 11, wherein the one or more processors are further configured to generate the second distribution using a Deep Bidirectional BERT-style transformer.

20. The system of claim 11, wherein the knowledge corpus comprises one or more websites remote from the processing system.

* * * * *